Feb. 13, 1962  F. J. GLIEBE  3,021,101
FISHING ROD HOLDER
Filed July 31, 1958
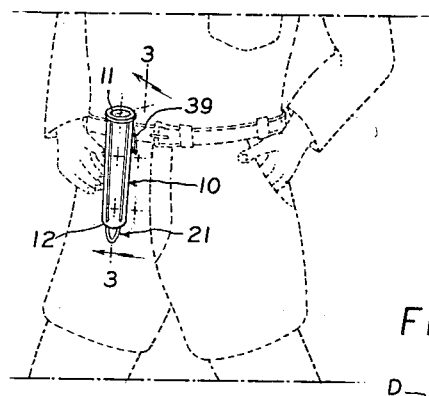
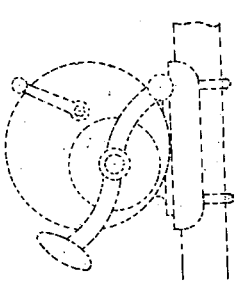
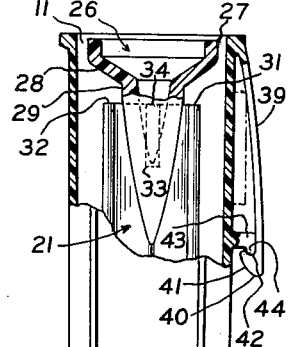
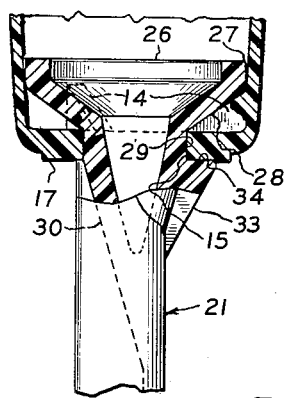
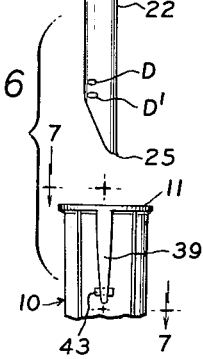
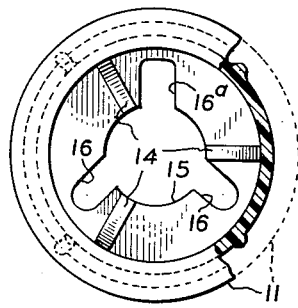
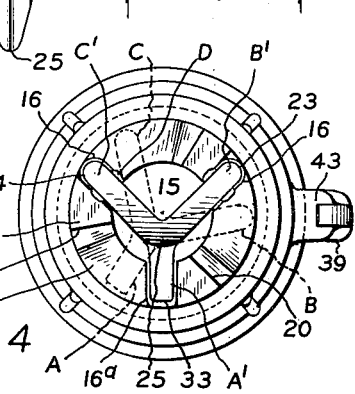
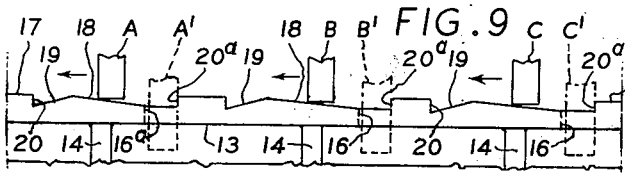
INVENTOR
FRANCIS J. GLIEBE
BY
his ATTORNEY 3,021,101
FISHING ROD HOLDER
Francis J. Gliebe, Jamaica, N.Y.
(1154 Myrtle Ave., Brooklyn 21, N.Y.)
Filed July 31, 1958, Ser. No. 752,278
2 Claims. (Cl. 248—44)

This invention relates to a fishing rod holder, and more particularly to a fishing rod holder having at one end a spike or stake adapted to be impaled in the ground and having at the other end a socket for holding the butt or handle of a fishing rod, thereby permitting a fisherman to leave a rod or rods unattended while still in fishing position.

Still more particularly, this invention relates to a collapsible fishing rod holder which permits the fisherman to stand his rod in a generally vertical position above the level of the ground, thereby avoiding the dangers attendant upon laying the rod upon the ground or sand and thus inviting fouling of the reel mechanism or breakage by passers-by stepping on the horizontal rod.

Still further, this invention relates to a collapsible fishing rod holder having novel construction, permitting all the parts to be molded of plastic, thereby providing a structure susceptible of highly economical manufacture.

Still further, this invention relates to a fishing rod holder which might be generally described as combining two sections, the first section being a socket arranged to hold the butt end or handle portion of a fishing rod, and the second section being described as a stake or spike adapted to be impaled in the ground in a manner to retain the first section in a generally vertically disposed position, or in such other position as the fisherman may desire, the two sections aforesaid including novel means whereby the stake section may alternatively be stored within the rod holder or socket section for compactness, or may be rigidly retained in extended position relative to the socket.

Still more particularly, this invention relates to a fishing rod holder as aforesaid, including novel snap means whereby the holder may be conveniently carried on the belt or the like appurtenance of a fisherman, when the said holder is in the collapsed position, the said novel snap means being susceptible of molding integrally with the operations incident to forming the other portions of the device.

Accordingly, it is an object of my invention to provide a fishing rod holder which may be molded in two pieces of a plastic or like material. Still a further object of this invention is to provide a collapsible fishing rod holder consisting generally of a fishing rod retaining section and an anchoring section, the said two sections being arranged alternatively to be maintained one within the other, for compactness when not in use, or in extended relation to each other, for serving the anchoring function aforesaid.

Still a further object of this invention is to provide a two-sectioned fishing rod holder having novel means whereby the two sections may be rigidly extended in relation to each other, or may be retained one within the other.

Still a further object of this invention is to provide a fishing rod holder as aforesaid, including novel carrying means integrally molded on the surface of the said holder which permits easy portability by providing a means of retaining the holder assembly on the belt or like appurtenance of a fisherman.

To attain these objects and such further objects as may appear herein or be hereinafter pointed out, I make reference to the accompanying drawings, forming a part hereof, in which—

FIGURE 1 is a perspective view of my invention in the collapsed position, illustrating the manner in which such holder would be worn by a fisherman;

FIGURE 2 is a side elevational view of my holder impaled in the ground and shown supporting the butt end of a fishing rod, parts of the said holder being broken away to shown details of construction;

FIGURE 3 is a magnified partial sectional view taken on the lines 3—3 of FIGURE 1;

FIGURE 4 is a magnified end elevation taken on the directional lines 4—4 of FIGURE 3;

FIGURE 5 is a magnified fragmentary section taken on the lines 5—5 of FIGURE 2;

FIGURE 6 is a side elevational view of a portion of the parts prior to assembly;

FIGURE 7 is a partial sectional view taken on the lines 7—7 of FIGURE 6;

FIGURE 8 is a magnified fragmentary section taken on the lines 8—8 of FIGURE 3;

FIGURE 9 is a diagrammatic development of the locking mechanism of my device.

In accordance with my invention, I provide an elongated, generally cylindrical but slightly tapering holder or socket member 10, said socket member having its widest portion at the open end 11 and its narrowest portion at the partially closed end 12. The socket 10 is preferably made of nylon or other resilient and corrosion resistant plastic material. The inner face 13 of the partially closed end 12 is provided with a series of radially extending, generally triangularly shaped reinforcing webs or ribs 14.

Through the partially closed end 12 there is formed a circular central opening 15, having a plurality of radially extending slots 16, which extend outwardly for nearly the entire surface of the bottom face 17 of the partially closed end, 12. The angular displacement of the slots 16 is about 120° to each other, with a medial slot distinguishable from the other two.

As best seen from FIGURE 9, the bottom face 17 is formed with cam portions 18 lying in close adjacency to the walls of the slots 16 for purposes which will hereafter appear. The camming faces 18 are provided in the trailing position relative thereto with the angular recess portions 19 and rearwardly thereof, with stop shoulders 20.

The anchoring or support function in my device is provided by a spike or stake 21 which may alternatively be secured in extending relation beyond the partially closed end 12 of the socket or, for portability and compactness, secured substantially entirely within the said socket 10, as shown in FIGURE 3.

The blade portion 22 of the stake or spike 21 consists of two longitudinally extended walls 23, 24, pointed at the lower end 25 to facilitate impaling in the ground. The upper end 26 of the stake 21 is provided with a circular headed portion 27 of a diameter closely approximating the internal diameter at the lowermost end of the tapered socket 10. Beneath the headed ring 27 is a frusto-conical segment 28, the angular orientation of the sides of the segment 28 corresponding exactly to the angles of the triangular sections or ribs 14, for purposes which will appear hereafter.

Beneath the conical portion 28 there is formed a cylindrical trunnion portion 29, the diameter of the said trunnion portion conforming substantially exactly to the diameter of the circular portion 15 cut out in the lower, partially closed end 12 of the socket 10.

The portion connecting the trunnion 29 with the walls 23, 24 is of a generally tapering configuration 30, thereby forming a core joining the upper extremities of the walls 23, 24, and thereby assuring centering of the trunnion 29 in the portion 15. The upper extremities of the walls 23, 24 terminate in proximate spaced relation from the headed portion 27, the upper terminal ends of said walls defining lugs or detents 31 and 32, respectively.

The spade 21 is provided, in addition, adjacent its upper end, wtih an offset member 33 having an upper terminal end or lug 34, which lug lies in a plane coterminus with the lugs 31, 32 for purposes which will appear hereafter.

The spade 21 is normally stored telescoped within the socket 10, with the ring 27 adjacent the upper edge 11 of the said socket. In this telescoped position, the tip 25 of the walls 23, 24 extends outwardly beyond the partially closed end 12 of the socket, the walls 23, 24 extending through the slots 16, 16.

As best seen in FIGURES 3, 6 and 8, the walls 23, 24 are provided adjacent the tip 25 with raised, integrally formed, semi-spherical nubs D, D', which nubs are spaced apart a distance slightly greater than the thickness of the end 12 of the socket. As seen in FIGURE 8, the said nubs will, in the retracted position of the said spike, span the walls adjacent the slots 16, 16, thereby preventing the said stake 21 from accidentally sliding outwardly. When it is desired to extend the stake 21, it is merely necessary to exert manual pressure on the headed portion 26 of the spade 21 which, by reason of the resiliency of the material including the nubs D, forces the latter through the slot portions 16, 16.

With the spade 21 thus freed, it may be slid longitudinally axially within the socket 10, the walls 24, 23 and slots 16, 16, serving as a guide to prevent relative rotation of the spade and socket.

In the lowermost position of the spade, the conic portion 28 will lie against the angular ribs 14, to form a seat for the same. When thus lowered, the trunnion portion 29 lies exactly within the cut out portion 15, the conic portions 30 serving to center the same within the said cut out portion.

I have provided my device with novel locking means, the operation of which means will best be understood by reference to the diagrammatic development illustrated in FIGURE 9.

As seen in said FIGURE 9, the lugs formed by the terminal ends 31, 32 and 34 of the walls 23, 24 and offset 33, respectively, lie outside the slots 16, 16 and 16a, respectively, in the positions indicated in FIGURE 9 as A', B' and C'. By grasping the spade 21 and socket 11, and rotating one relative to the other, in the direction indicated by the arrows in FIGURE 9, the lugs 31, 32 and 34 are forced over the resilient camming faces 18, causing a minute inward movement of the said faces. The location of reinforcing webs 14 relative to the slots 16, 16 and 16a and seats or recesses 19 is calculated to permit a maximum amount of flexing of the faces 18 when the camming pressure of the faces 18 against the lugs 31, 32, 34 is greatest.

The characters A, B and C of FIGURE 9 are indicative of the position of the lugs in an intermediate position prior to completion of the locking cycle.

Further relative rotation of the stake and socket will cause the lugs 31, 32 and 34 to lie against the stop shoulders 20 and to snap into the angular recessed portions 19, thereby securing the said stake and socket in mutually rotated position under pressure created by flexing the resilient plastic. It will be readily recognized that in such mutually rotated position, the stake is disabled from collapsing to a position within the socket by reason of the fact that the lugs 31, 32 and 34 are in the said rotated position, out of register with the slots 16, 16 and 16a. As a result of the camming action aforesaid, the conic portion 28 has been drawn tightly against the triangular portions 14 forming a close fitting seat therefor, thereby forming an extremely rigid connection between the extended stake and the socket.

In order to collapse the rod holder to the compacted or inwardly telescoped position shown in FIGURE 3, it will merely be necessary to rotate the spike relative to the socket in a direction opposite to the direction of rotation for locking.

Relative rotation of the spade and socket for demounting requires vigorous turning in the direction aforesaid, by reason of the rather steep camming face of the recessed portions 19 as compared with the more gradual cam face of the portions 18.

In the operation of unlocking the spike and socket assembly, the rearward shoulders 20a formed by an extension of the stop shoulder portion 20 serve as guides in cooperation with lugs 31, 32 and 34, to align the said lugs and consequently the walls 24, 23 with the slots 16, 16 and 16a. When thus aligned, the stake 21 may be slid upwardly into telescoping position within the socket 10, the stake being retained in said upward orientation with the socket by the action of the detents or nubs, D, D' aforesaid.

For convenience in carrying, I have provided my device with a snap hook fastener assembly arranged to form a loop, the rearmost side of the said loop being formed by a portion of the wall of the socket member.

Accordingly, I have provided my device with an extended resilient bail or arm portion 39, molded integrally with the socket member at 11 and having a free end 40 provided with a camming face 41 and a recess 42 adjacent the said camming face. On the socket member 10 there is integrally formed an upstanding stud 43 having a downwardly depending finger portion 44 at the end thereof.

It will be seen from FIGURE 3 that the rod holder may be attached to the belt of the wearer—see dotted lines—passing the bail or arm 39 over the belt and then pressing the end 40 of the said arm inwardly toward the socket 10, thereby forcing the camming surface 41 against the finger 44, causing the said finger to be snapped into the recess 42 on the bail or arm 39.

The structure above described is highly advantageous in that it may be molded in two parts, which two parts may be integrated by the user to form a collapsed fishing rod and holder portion and spike portion, which two portions may be extended in use.

A further advantage of my invention lies in the fact that the material from which it is made, i.e. nylon or like resilient plastic material, is highly resistant to the corrosive forces such as salt water or the like, normally associated with fishing.

The novel locking assembly herein described makes use of the inherent resilient properties of nylon or the like, to provide a tight locking connection in the extended position of the spike relative to the socket, thereby assuring against accidental disengagement of the said parts.

The angularly directed wall members of my device, when anchored in the ground, provide a high degree of stability in resisting uprooting or overturning forces, from whichever direction applied.

The novel snap loop fastener assembly is a further convenient feature of my fishing rod holder, which feature may be provided without serious additional cost, by reason of the fact that the loop and loop anchoring portions may be molded integrally with the socket member of my holder.

Having thus described my invention and illustrated its use, what I claim as new and desire to secure by Letters Patent, is:

1. A collapsible holder for fishing rods comprising a hollow, elongated socket member arranged to receive the butt of a fishing rod and a stake member arranged to be selectively secured in collapsed position within said socket member for storage or in extended position relative to said socket member, said socket member having an open end through which said butt is inserted and a partially closed end having portions outlining a plurality of angularly disposed slots, the stake having a plurality of longitudinally extended, angularly disposed walls corresponding in cross section to, and disposed within, said slots, a head portion at one end of said stake of a size to cooperate with said partially closed end to prevent endwise removal of said stake through said end, a reduced clearance portion formed in said walls adjacent said head arranged to enable said angularly disposed walls to clear said slots in the extended position of said stake, whereby said stake may be rotated relative to said socket, a locking lug defined by the upper terminal edge of at least one of said walls adjacent said clearance portion, and a resilient cam member formed on the outer face of said partially open end, said cam member including in trailing position relative thereto, a stop shoulder portion and a seating recess portion, said cam member being arranged to cooperate with said lug when said stake is rotated with said clearance portion in registry with said slots to seat said lug against said shoulder and in said recess portion, thereby maintaining said stake in extended position.

2. A collapsible holder for fishing rods comprising a hollow, elongated socket member of nylon arranged to receive the butt of a fishing rod and a stake member arranged to be selectively secured in collapsed position within said socket member for storage, or in extended position relative to said socket member, said socket member including an open end through which said butt is inserted, and a partially closed end, said stake including at one end a headed portion and a plurality of offset lugs in proximate spaced relation to said headed portion, and said partially closed end including cutout portions defining openings positioned to permit passage therethrough of said lugs but not said headed portion, a clearance portion formed in said stake in the space between said lugs and headed portion, said clearance portion enabling said offset lugs to clear said cutout portions in the extended position of said stake, resilient cam portions formed on the outer face of said partially closed end adjacent said openings, said cam portions having seats in trailing position relative thereto, said cam portions being positioned to cooperate with said lugs when said stake is rotated in said socket to wedge said headed portion tightly against the inner face of said partially closed end and simultaneously to deform said cam portions, thereby permitting said lugs to snap into said seats upon further rotation of said stake.

References Cited in the file of this patent

UNITED STATES PATENTS

| | | |
|---|---|---|
| 632,064 | Roberts | Aug. 29, 1899 |
| 2,414,358 | Calway | Jan. 14, 1947 |
| 2,418,410 | Hull | Apr. 1, 1947 |
| 2,603,440 | Le Vesconte | July 15, 1952 |
| 2,612,334 | Delamere | Sept. 30, 1952 |
| 2,823,434 | Van Buren | Feb. 18, 1958 |